(12) United States Patent
Jo

(10) Patent No.: US 11,512,751 B2
(45) Date of Patent: Nov. 29, 2022

(54) PARKING BRAKE APPARATUS FOR VEHICLE

(71) Applicant: HYUNDAI MOBIS CO., LTD., Seoul (KR)

(72) Inventor: Chi Hoon Jo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 47 days.

(21) Appl. No.: 16/930,101

(22) Filed: Jul. 15, 2020

(65) Prior Publication Data

US 2021/0018054 A1   Jan. 21, 2021

(30) Foreign Application Priority Data

Jul. 16, 2019 (KR) ................. 10-2019-0086035

(51) Int. Cl.
*B60T 13/74* (2006.01)
*F16D 65/18* (2006.01)
*F16D 121/24* (2012.01)

(52) U.S. Cl.
CPC .......... *F16D 65/18* (2013.01); *B60T 13/741* (2013.01); *B60T 13/746* (2013.01); *F16D 2121/24* (2013.01)

(58) Field of Classification Search
CPC .... F16D 55/226; F16D 65/183; F16D 65/586; F16D 2121/24; F16D 2125/50; F16D 2125/52; F16D 2125/40; F16D 2125/34; F16D 2127/06; B60T 13/741; B60T 13/746
See application file for complete search history.

(56) References Cited

U.S. PATENT DOCUMENTS

| | | | |
|---|---|---|---|
| 6,554,109 B1 | 4/2003 | Olschewski et al. | |
| 10,605,315 B2* | 3/2020 | Esnee | F16D 65/183 |
| 2007/0151816 A1* | 7/2007 | Gil | B60T 13/746 |
| | | | 188/2 D |
| 2018/0135710 A1 | 5/2018 | Sala et al. | |
| 2019/0063527 A1* | 2/2019 | Thomas | B60T 13/741 |
| 2019/0219117 A1* | 7/2019 | Choi | F16D 65/183 |
| 2020/0361437 A1* | 11/2020 | Esnee | B60T 13/741 |
| 2021/0016758 A1* | 1/2021 | Choi | F16D 65/183 |
| 2021/0016759 A1* | 1/2021 | Choi | F16D 55/226 |

(Continued)

FOREIGN PATENT DOCUMENTS

| | | |
|---|---|---|
| CN | 1067101 A | 12/1992 |
| CN | 107355496 A | 11/2017 |

(Continued)

OTHER PUBLICATIONS

Office Action issued in corresponding Chinese Patent Application No. 202010687070.4, dated Oct. 25, 2021.

*Primary Examiner* — Nicholas J Lane
(74) *Attorney, Agent, or Firm* — Morgan, Lewis & Bockius LLP

(57) ABSTRACT

A parking brake apparatus for a vehicle includes a pair of pressing units receiving power from a driving unit, and pressing a brake pad; a load transmission unit installed between the pair of pressing units, connected to each of the pair of pressing units, and transmitting a pressing load of any one of the pair of pressing units to the other pressing unit; and a load transmission unit restraint unit selectively restraining driving of the load transmission unit.

15 Claims, 12 Drawing Sheets

(56) References Cited

U.S. PATENT DOCUMENTS

| | | | | |
|---|---|---|---|---|
| 2021/0016760 A1* | 1/2021 | Hong | ................... | B60T 13/741 |
| 2021/0016761 A1* | 1/2021 | Choi | ..................... | F16D 65/183 |
| 2021/0018054 A1* | 1/2021 | Jo | ......................... | F16D 65/568 |
| 2021/0086742 A1* | 3/2021 | Kwon | ..................... | F16D 55/02 |
| 2021/0122351 A1* | 4/2021 | Hong | ................... | F16D 65/568 |

FOREIGN PATENT DOCUMENTS

| | | |
|---|---|---|
| DE | 102 96 905 T5 | 5/2004 |
| DE | 699 25 489 T2 | 5/2006 |
| DE | 10 2009 023 432 A1 | 12/2009 |
| DE | 10 2016 219 409 A1 | 11/2017 |

\* cited by examiner

PARKING BRAKE APPARATUS FOR VEHICLE

CROSS-REFERENCE TO RELATED APPLICATION

This application claims priority from and the benefit of Korean Patent Application No. 10-2019-0086035, filed on Jul. 16, 2019, which is hereby incorporated by reference for all purposes as if set forth herein.

BACKGROUND

Field

Exemplary embodiments of the present disclosure relate to a parking brake apparatus for a vehicle, and more particularly, to a parking brake apparatus for a vehicle capable of uniformly transmitting loads to a brake pad.

Discussion of the Background

In general, an actuator of an electronic parking brake for a vehicle is constructed by a motor and a power transmission device for operating friction pads installed in a caliper of a disc brake apparatus when parking.

When a driver pushes a parking brake switch, the rotational force of a motor of the actuator is transmitted to an input shaft of the caliper through the power transmission device such as a reduction gear. Through the rotation of the input shaft, a pressure connection sleeve is moved forward, and by the forward movement of the pressure connection sleeve, a piston which accommodates the pressure connection sleeve and a caliper housing are moved toward each other, such that two friction pads mounted to the piston and the caliper housing are pressed against both surfaces of a disc to restrain the rotation of the disc.

In the case where a plurality of pistons are provided and receive a driving force from a single actuator, loads may be non-uniformly transmitted to the plurality of pistons. In this case, uneven wear of friction pads may be caused, and the braking performance may be degraded.

SUMMARY

Various embodiments are directed to a parking brake apparatus for a vehicle capable of uniformly transmitting loads to a brake pad by a load transmission unit.

In an embodiment, a parking brake apparatus for a vehicle may include: a pair of pressing units receiving power from a driving unit, and pressing a brake pad; a load transmission unit installed between the pair of pressing units, connected to each of the pair of pressing units, and transmitting a pressing load of any one of the pair of pressing units to the other pressing unit; and a load transmission unit restraint unit selectively restraining driving of the load transmission unit.

Each of the pair of pressing units may include: a sun gear section rotated by receiving power from the driving unit; a planetary gear section rotated by being meshed with the sun gear section; a carrier section coupled to the planetary gear section; and a piston section connected to the carrier section, and pressing the brake pad by being moved toward the brake pad through receiving rotational power from the planetary gear section.

The load transmission unit may include a pair of ring gear sections, each of the pair of ring gear sections may be rotatable by being meshed with the planetary gear section, and the pair of ring gear sections may be directly meshed with each other.

The load transmission unit restraint unit may include: a restraint driving section providing power; a restraint lever extended and retracted by an operation of the restraint driving section; a restraint gear rotatably installed, and restrained in its rotation when the restraint lever is extended; and an interlocked gear coupled to the restraint gear, rotated in an interlocked manner when the restraint gear is rotated, and disposed to be meshed with the ring gear section.

The load transmission unit may include: a pair of ring gear sections each rotatable by being meshed with the planetary gear section; and one or more transmission gear sections disposed between the pair of ring gear sections, and meshed with the ring gear sections.

The load transmission unit restraint unit may include: a restraint driving section providing power; a restraint lever extended and retracted by an operation of the restraint driving section; a restraint gear rotatably installed, and restrained in its rotation when the restraint lever is extended; and an interlocked gear coupled to the restraint gear, rotated in an interlocked manner when the restraint gear is rotated, and disposed to be meshed with the ring gear section.

The load transmission unit restraint unit may include: a restraint driving section providing power; a restraint lever extended and retracted by an operation of the restraint driving section; a restraint gear rotatably installed, and restrained in its rotation when the restraint lever is extended; and an interlocked gear coupled to the restraint gear, rotated in an interlocked manner when the restraint gear is rotated, and disposed to be meshed with the transmission gear section.

The restraint driving section may include a solenoid section which extends and retracts the restraint lever with an electromagnetic force when electric power is inputted.

The driving unit may include: a motor section receiving electric power from an outside, and generating power; and a power transmission section rotated by driving of the motor section, and transmitting a rotational force to the sun gear section.

The power transmission section may include: a transmission worm wheel disposed at a middle portion of a transmission shaft, coupled to the motor section, and receiving power from the motor section; and transmission worm gears disposed at both sides of the transmission worm wheel, and each transmitting a rotational force of the transmission worm wheel to the sun gear section.

The power transmission section may transmit power to the sun gear section through a connection gear section.

The connection gear section may include: a connection gear body coupled to the sun gear section; and a connection wheel formed on an outer circumferential surface of the connection gear body, and meshed with the power transmission section.

Each of the pair of ring gear sections may include: a ring gear inner part formed with an internal gear portion on an inner circumferential surface thereof to be meshed with the planetary gear section; and a ring gear outer part coupled to an outer surface of the ring gear inner part, and formed with an external gear portion on an outer circumferential surface thereof.

The ring gear inner part may project more toward the sun gear section than the ring gear outer part, and may surround the sun gear section and the planetary gear section.

The carrier section may be spline-coupled to the piston section.

The piston section may receive rotational power from the carrier section, and may be linearly reciprocated relative to the brake pad depending on a rotating direction of the carrier section.

In the parking brake apparatus for a vehicle according to the present disclosure, when a pressing load is concentrated on any one of a plurality of pressing units, a load transmission unit may transmit the pressing load to the remaining pressing unit, so that the pressing units may press a brake pad with uniform loads.

DETAILED DESCRIPTION OF THE ILLUSTRATED EMBODIMENTS

Hereinafter, a parking brake apparatus for a vehicle will be described below with reference to the accompanying drawings through various examples of embodiments. It should be noted that the drawings are not to precise scale and may be exaggerated in thickness of lines or sizes of components for descriptive convenience and clarity only.

Furthermore, the terms used herein are defined by taking functions of the invention into account and can be changed according to the intention of users or operators or the practice. Therefore, definition of the terms should be made according to the overall disclosures set forth herein.

Figure 1:
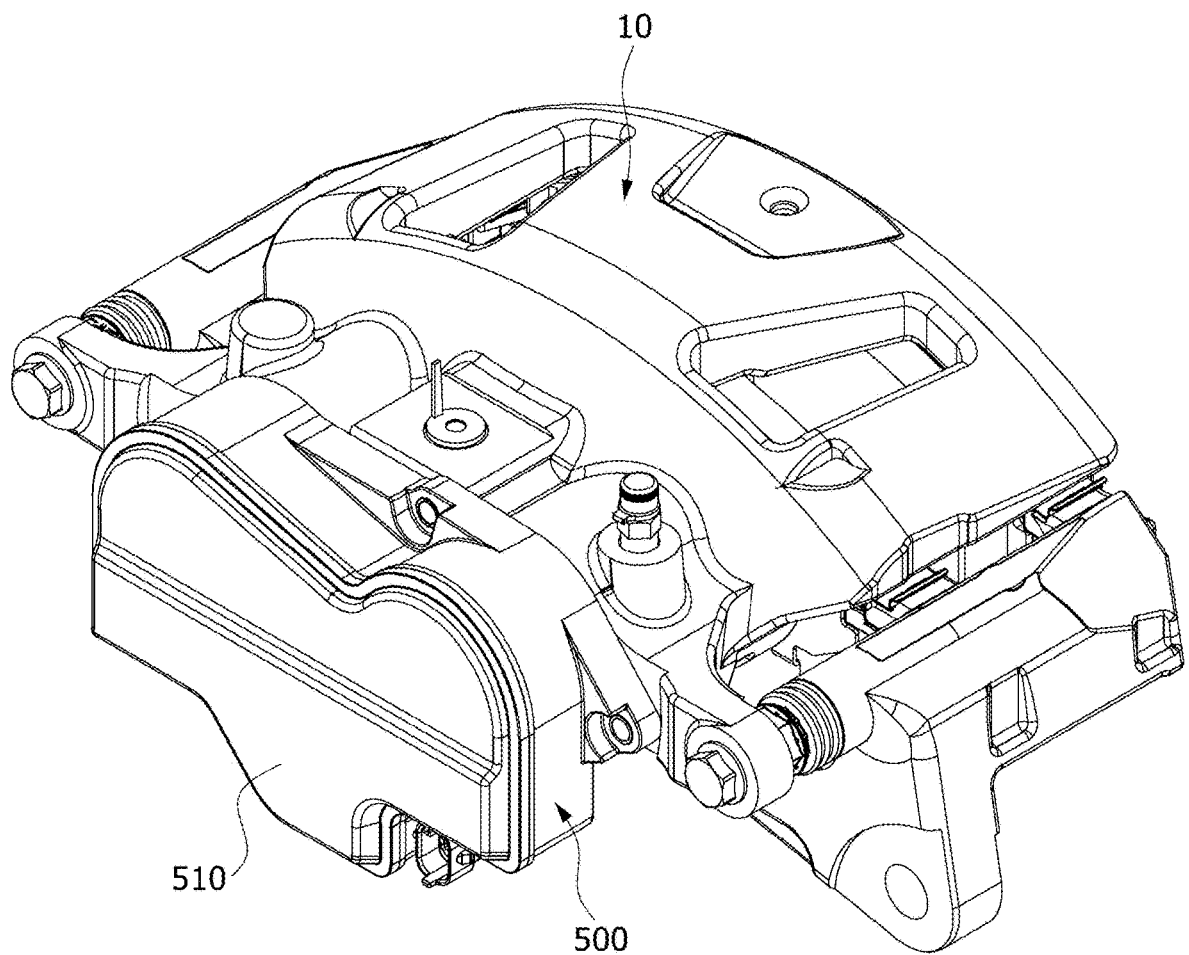
FIG. 1 is a perspective view illustrating a parking brake apparatus for a vehicle in accordance with an embodiment of the present disclosure.
Figure 2:
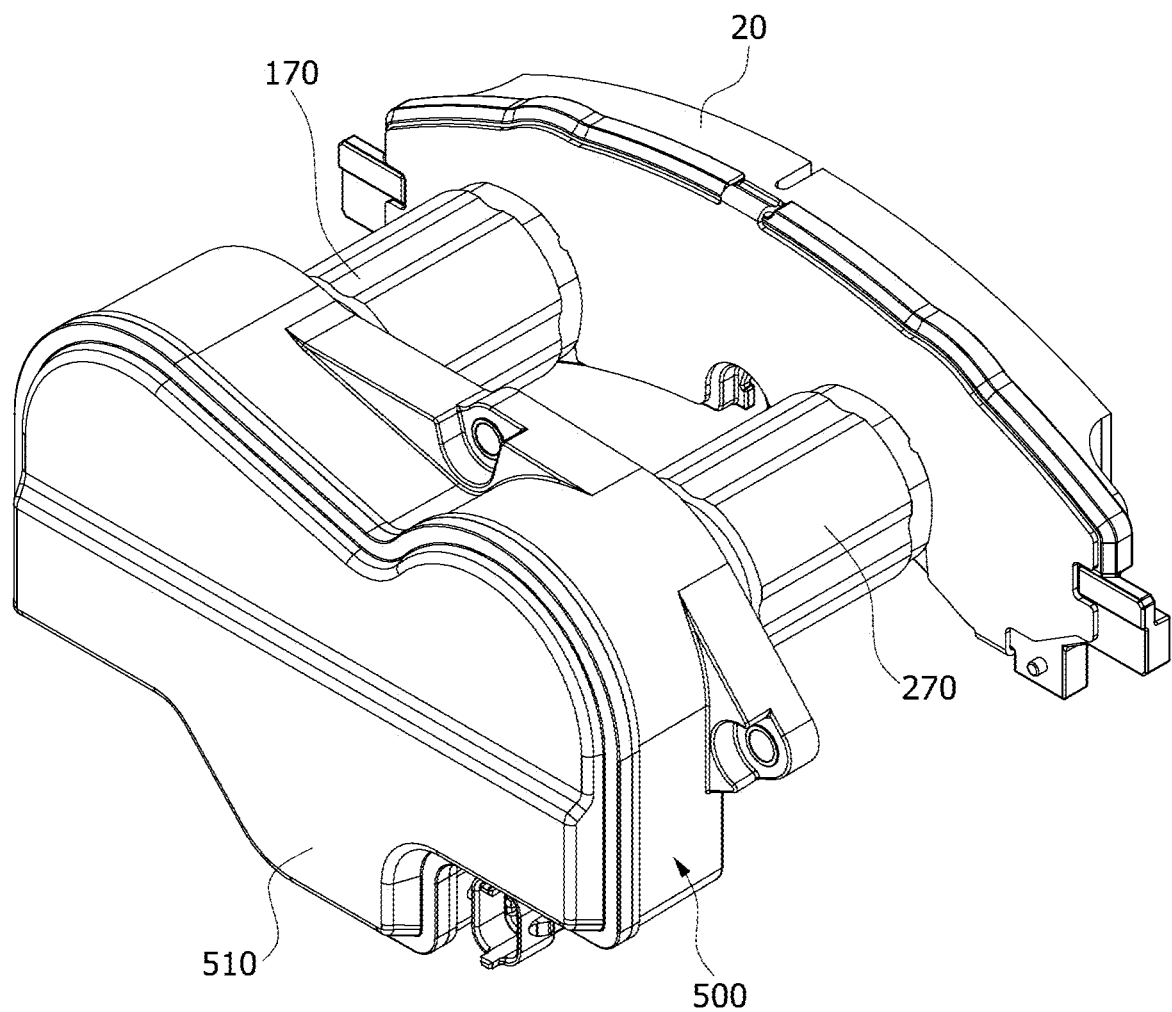
FIG. 2 is a partial perspective view illustrating the parking brake apparatus for a vehicle in accordance with the embodiment of the present disclosure.
Figure 3:
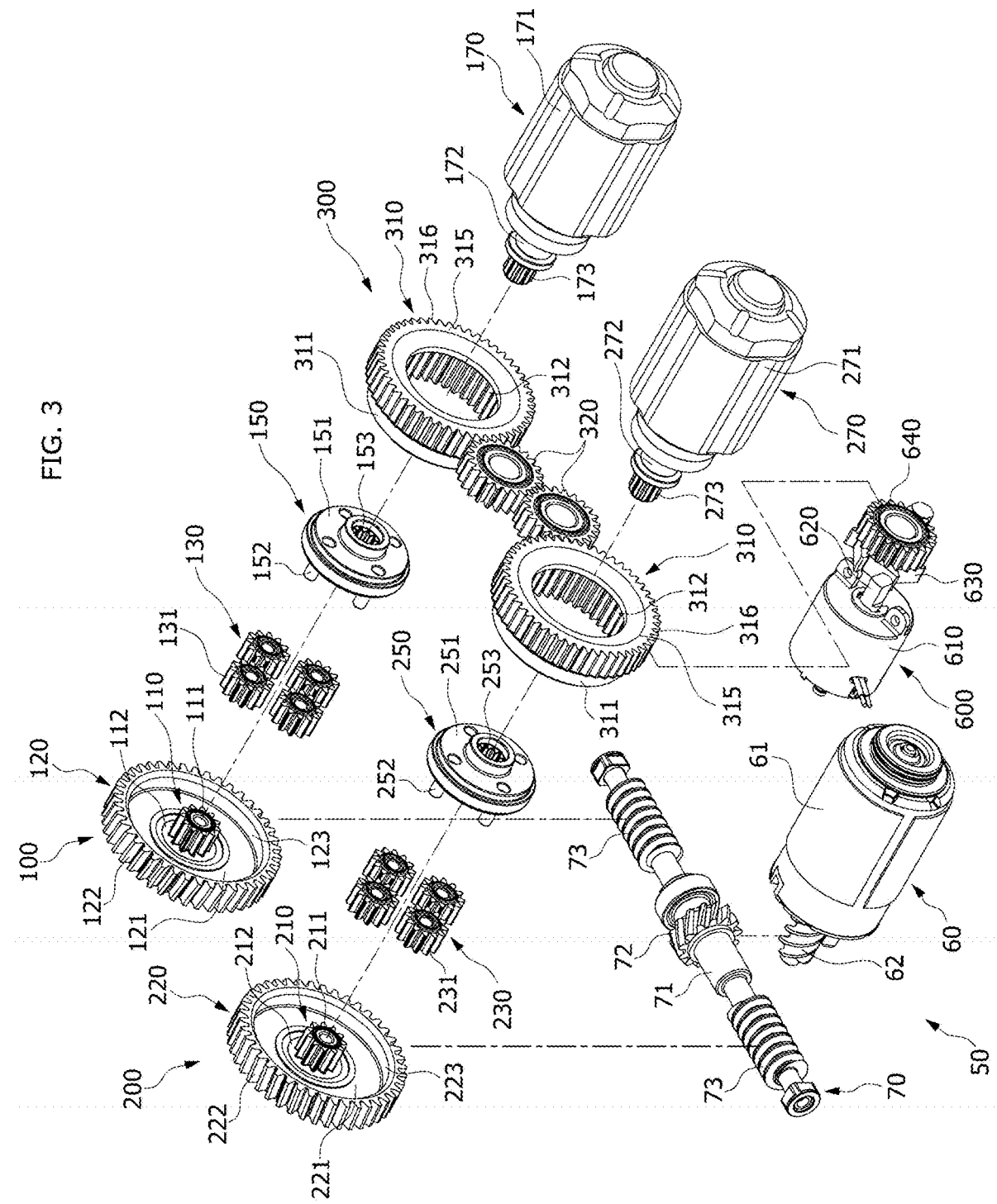
FIG. 3 is a partial front exploded view illustrating the parking brake apparatus for a vehicle in accordance with the embodiment of the present disclosure.
Figure 4:
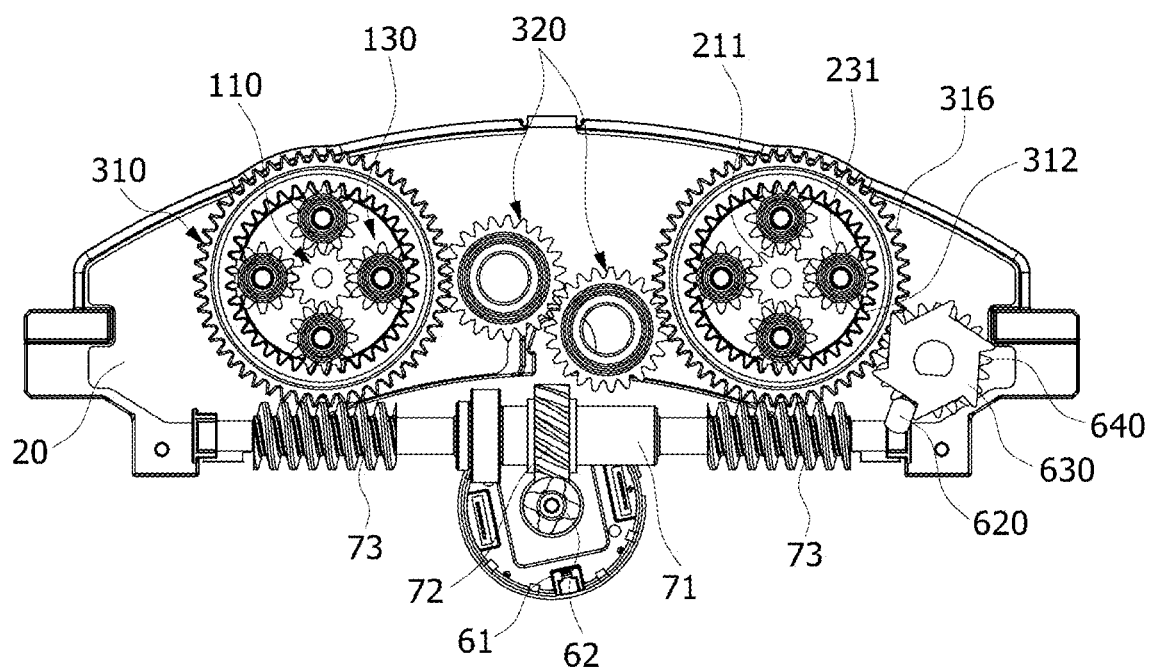
FIGS. 4 and 12 are front views illustrating the parking brake apparatus for a vehicle in accordance with various embodiments of the present disclosure.
Figure 5:
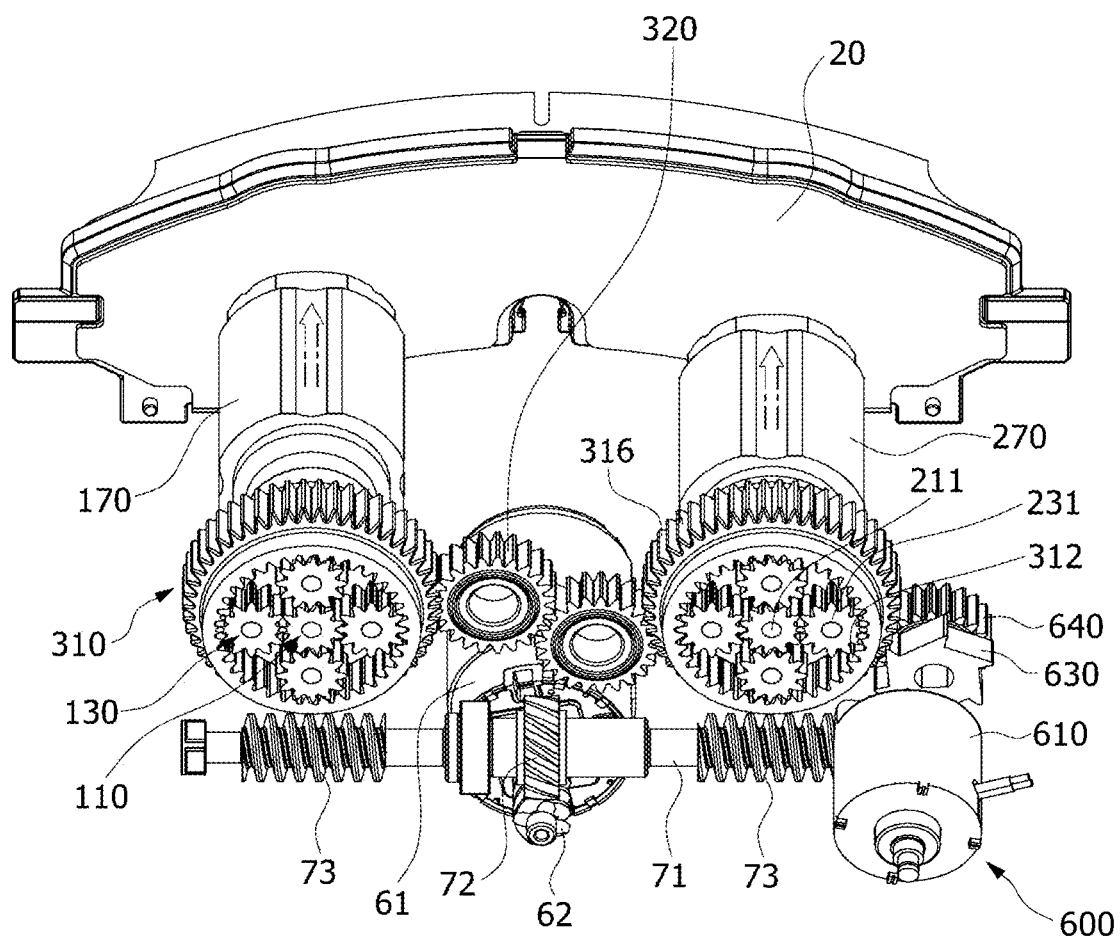
FIGS. 5 to 7 are state views illustrating driving states of the parking brake apparatus for a vehicle in accordance with the embodiment of the present disclosure.
Figure 6:
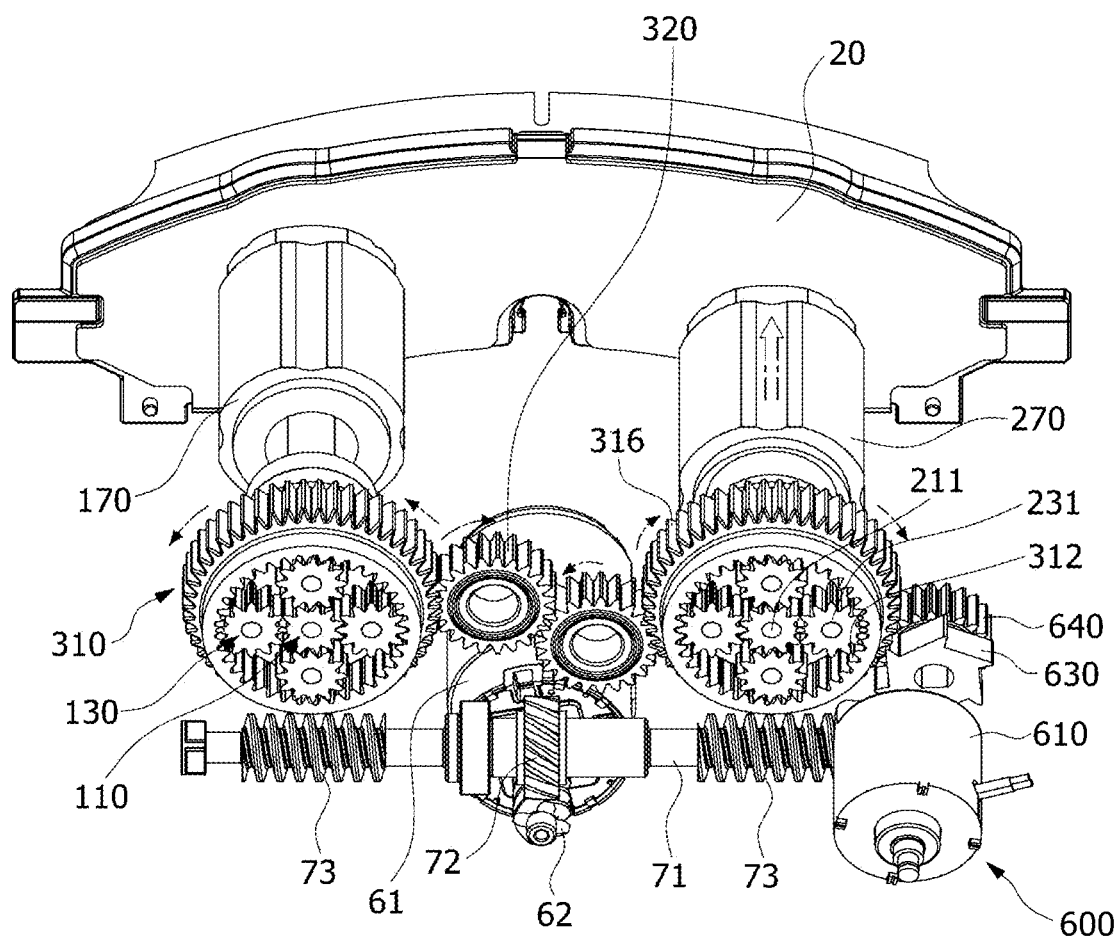
Figure 7:
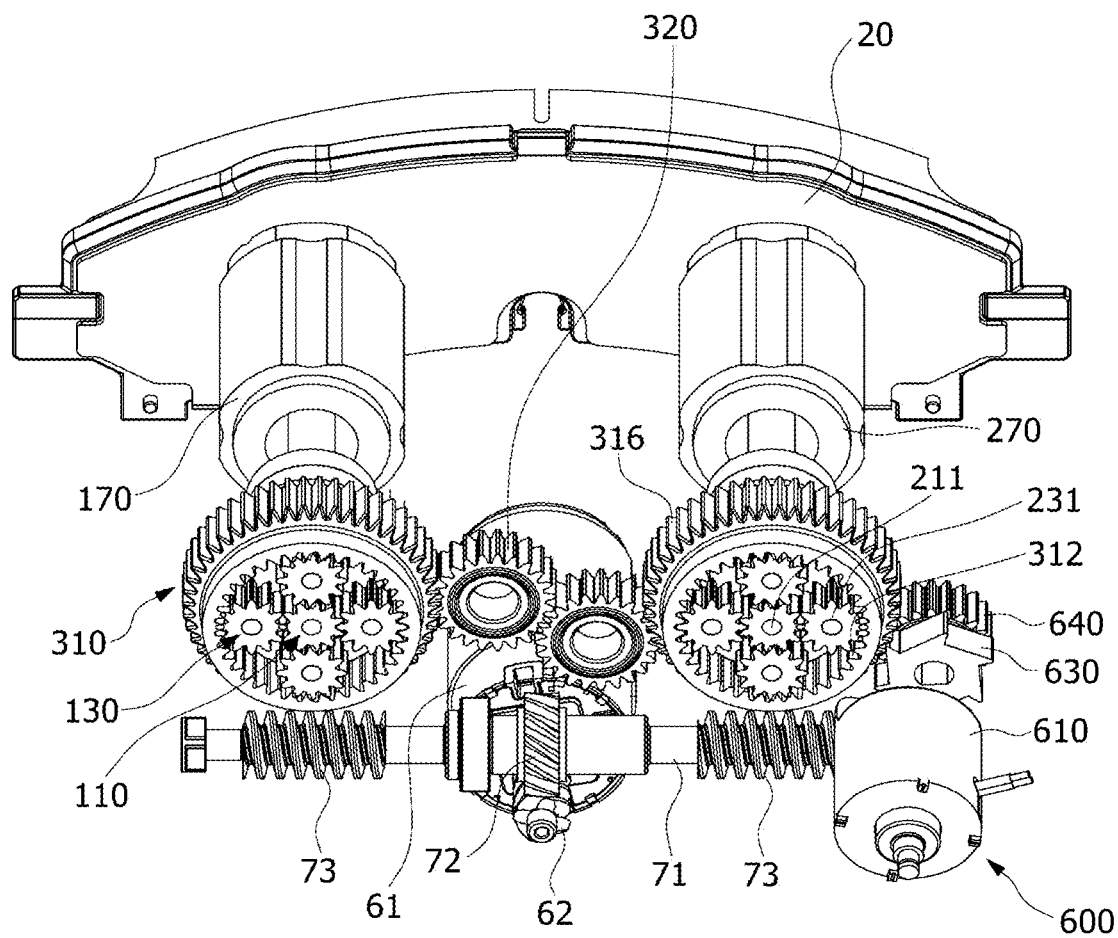
Figure 8:
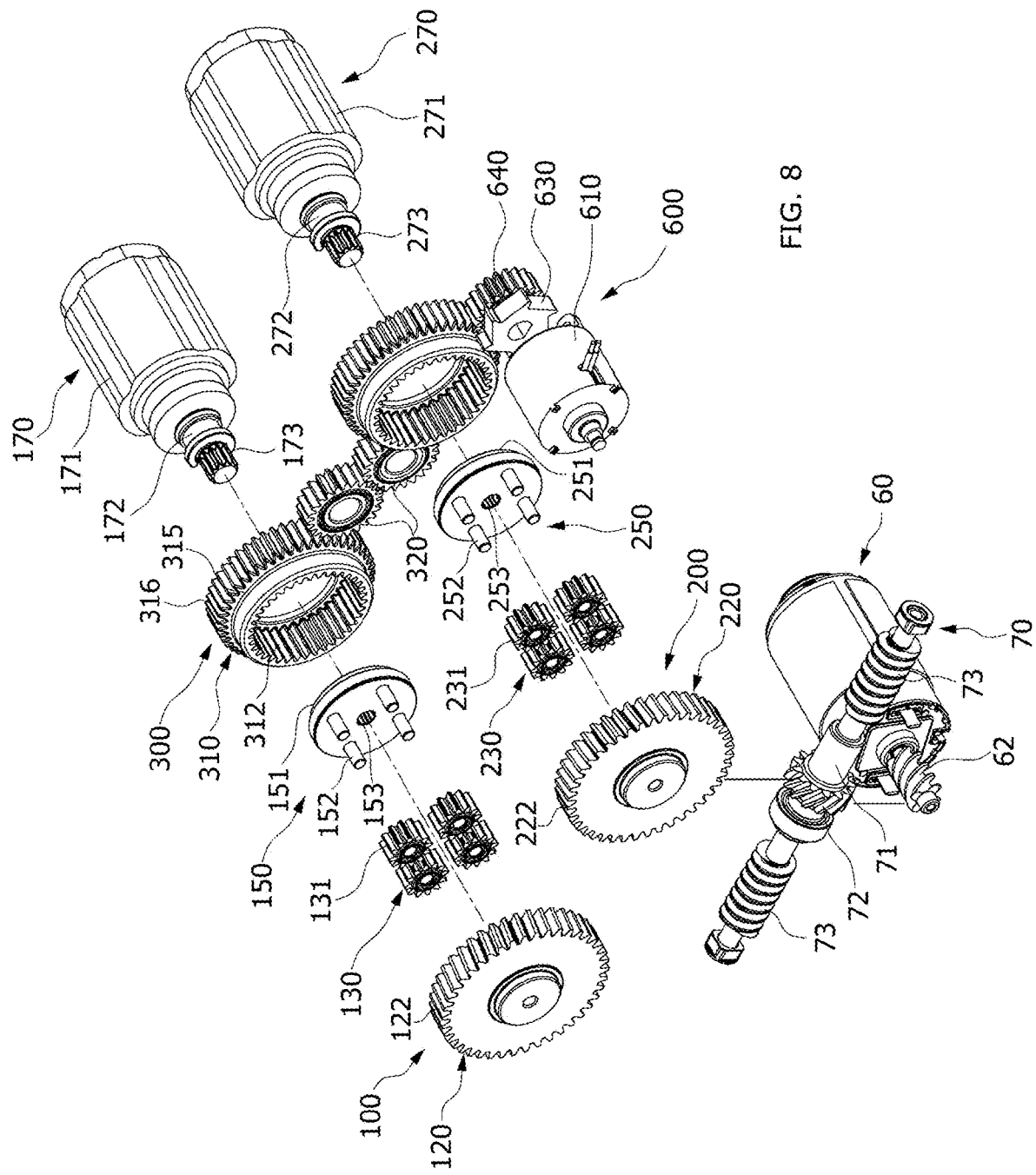
FIG. 8 is a partial rear exploded view illustrating the parking brake apparatus for a vehicle in accordance with the embodiment of the present disclosure.
Figure 9:
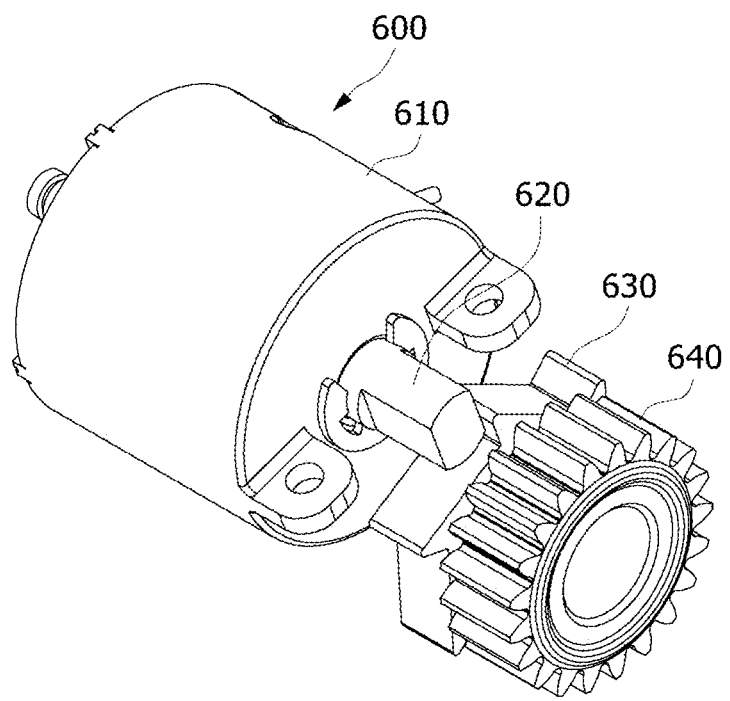
FIG. 9 is a perspective view illustrating a load transmission unit restraint unit in accordance with the embodiment of the present disclosure.
Figure 10:
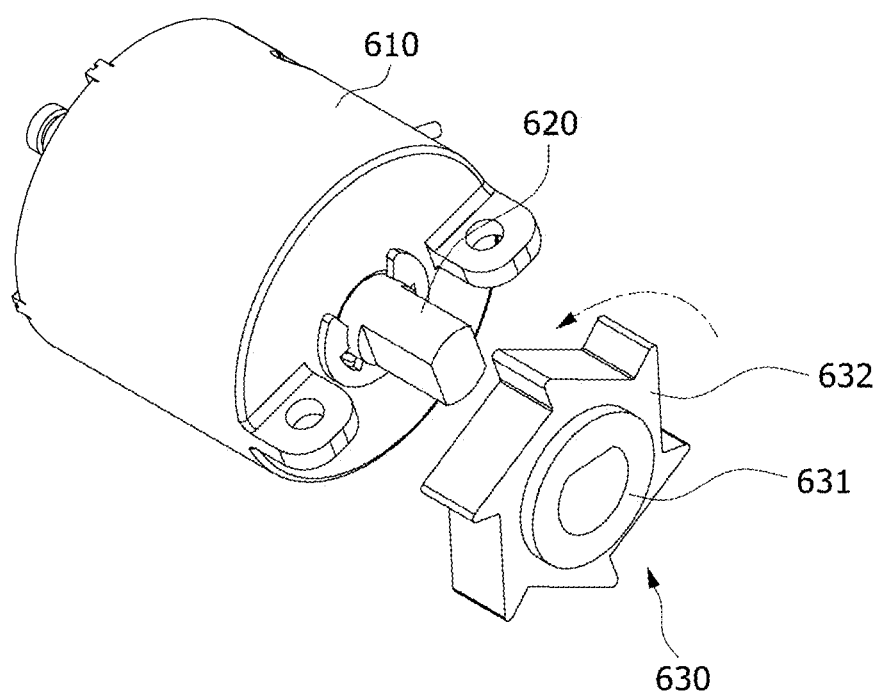
FIG. 10 is a view illustrating a state in which the load transmission unit restraint unit in accordance with the embodiment of the present disclosure does not restrain the driving of a load transmission unit.
Figure 11:
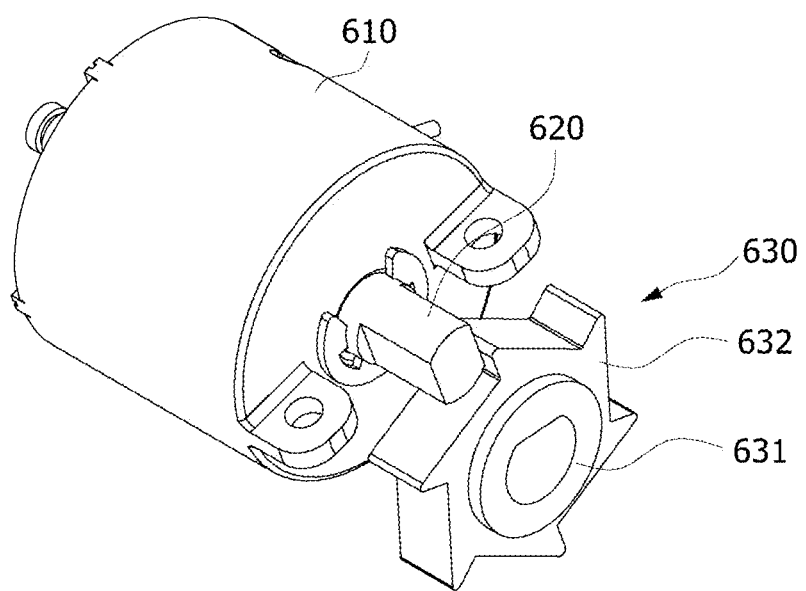
FIG. 11 is a view illustrating a state in which the load transmission unit restraint unit in accordance with the embodiment of the present disclosure restrains the driving of the load transmission unit.

FIG. 1 is a perspective view illustrating a parking brake apparatus for a vehicle in accordance with an embodiment of the present disclosure. FIG. 2 is a partial perspective view illustrating the parking brake apparatus for a vehicle in accordance with the embodiment of the present disclosure. FIG. 3 is a partial front exploded view illustrating the parking brake apparatus for a vehicle in accordance with the embodiment of the present disclosure. FIG. 4 is a front view illustrating the parking brake apparatus for a vehicle in accordance with the embodiment of the present disclosure. FIGS. 5 to 7 are state views illustrating driving states of the parking brake apparatus for a vehicle in accordance with the embodiment of the present disclosure. FIG. 8 is a partial rear exploded view illustrating the parking brake apparatus for a vehicle in accordance with the embodiment of the present disclosure. FIG. 9 is a perspective view illustrating a load transmission unit restraint unit in accordance with the embodiment of the present disclosure. FIG. 10 is a view illustrating a state in which the load transmission unit restraint unit in accordance with the embodiment of the present disclosure does not restrain the driving of a load transmission unit. FIG. 11 is a view illustrating a state in which the load transmission unit restraint unit in accordance with the embodiment of the present disclosure restrains the driving of the load transmission unit.

Referring to FIGS. 1 to 5, a parking brake apparatus 1 for a vehicle in accordance with the embodiment of the present disclosure includes a driving unit 50, pressing units 100 and 200, and a load transmission unit 300.

The driving unit 50 includes a motor section 60 which receives electric power from the outside and generates power. The motor section 60 includes a motor body 61 which generates power and a driving gear 62 which is rotated by the motor body 61.

In the present embodiment, the driving gear 62 is formed in the shape of a worm gear, but the shape thereof may be replaced with other gear shapes or the likes as long as the driving gear 62 can transmit power to the pressing units 100 and 200 or a power transmission section 70.

The driving unit 50 further includes the power transmission section 70. That is to say, the motor section 60 of the driving unit 50 may indirectly transmit generated power to the pressing units 100 and 200 through the power transmission section 70.

The power transmission section 70 includes a transmission shaft 71, a transmission worm wheel 72, and transmission worm gears 73. The transmission worm wheel 72 is meshed with the driving gear 62 and receives power from the driving gear 62.

The transmission worm wheel 72 is disposed at the middle portion of the transmission shaft 71, and the transmission worm gears 73 are disposed at both sides of the transmission worm wheel 72, respectively. Therefore, if the transmission worm wheel 72 is rotated by the driving gear 62, each of the transmission worm gears 73 at both ends of the transmission shaft 71, which are connected to the transmission worm wheel 72, is rotated in an interlocked manner.

As such, according to the present embodiment, even though one transmission worm wheel 71 is rotated using one motor section 60, the two transmission worm gears 73 which are connected to the transmission worm wheel 72 may be simultaneously rotated, which makes it possible to simultaneously provide power to the pair of pressing units 100 and 200.

In other words, the power transmission section 70 has a structure in which one transmission worm wheel 72 is installed at the middle portion of the transmission shaft 71 and the pair of transmission worm gears 73 are connected to the transmission worm wheel 72 and are installed at both sides of the transmission worm wheel 72, respectively, and thus, can simultaneously transmit the same force to each of the pair of pressing units 100 and 200.

In addition, since power can be transmitted by including only the transmission worm wheel 72 and the transmission worm gears 73, the structure of the power transmission section 70 may be simplified, whereby the assemblability and operational reliability may be improved and an installation space may be reduced.

Referring to FIGS. 1 to 3, the parking brake apparatus 1 for a vehicle in accordance with the present embodiment includes a mounting case 500 and a mounting cover 510.

The driving unit 50, the pressing units 100 and 200 and the load transmission unit 300 are disposed in the mounting case 500. The mounting cover 510 is detachably coupled to the mounting case 500, and closes one side opening of the mounting case 500 to prevent foreign matters from entering the inside of the mounting case 500.

The pressing units 100 and 200 in accordance with the embodiment of the present disclosure are installed in a caliper housing 10, receive power from the driving unit 50, and press a brake pad 20 which is brought into frictional contact with a disc (not illustrated).

A plurality of pressing units 100 and 200 are provided. The plurality of pressing units 100 and 200 are disposed side by side. The pressing units 100 and 200 are symmetrically installed at left and right sides (in FIG. 4) with respect to the center portion of the brake pad 20.

The pressing units 100 and 200 receive power from the driving unit 50, and press the brake pad 20 with the same pressing loads. The brake pad 20 is moved toward the disc by such pressing forces, and a braking force is generated due to the friction between the brake pad 20 and the disc.

The pressing units 100 and 200 in accordance with the embodiment of the present disclosure include sun gear sections 110 and 210, connection gear sections 120 and 220, planetary gear sections 130 and 230, carrier sections 150 and 250, and piston sections 170 and 270.

Meanwhile, in the illustration of FIGS. 4 to 7, connection gear bodies 121 and 221 of the connection gear sections 120 and 220 are omitted for the sake of convenience in explanation.

The connection gear sections 120 and 220 include the connection gear bodies 121 and 221, connection wheels 122 and 222, and connecting insertion parts 123 and 223.

The connection gear sections 120 and 220 include the connection wheels 122 and 222 formed on the outer circumferential surfaces thereof to be meshed with the driving unit 50, specifically, the transmission worm gears 73 of the power transmission section 70, respectively.

Due to this fact, the power generated in the motor section 60 is transmitted to the connection wheels 122 and 222 through the power transmission section 70. That is to say, the power of the driving unit 50 is transmitted to the connection gear sections 120 and 220 and rotates the connection gear sections 120 and 220. The connection wheels 122 and 222 may be formed in the shapes of worm wheels.

The connecting insertion parts 123 and 223 are formed in spaces inside the connection wheels 122 and 222. In other words, the connection wheels 122 and 222 are formed on the outsides of walls formed on the outer circumferential surfaces of the connection gear bodies 121 and 221, and the connecting insertion parts 123 and 223 are formed in the spaces inside the walls on which the connection wheels 122 and 222 are formed.

Ring gear sections 310, specifically, ring gear inner parts 311, are inserted into the connecting insertion parts 123 and 223. The connecting insertion parts 123 and 223 are formed in the shapes of grooves.

The sun gear sections 110 and 210 are rotated by receiving power from the driving unit 50. According to the present embodiment, the sun gear sections 110 and 210 are coupled to the connection gear sections 120 and 220. The sun gear sections 110 and 210 may be rotated through the connection gear sections 120 and 220 which are dynamically connected to the driving unit 50.

The sun gear sections 110 and 210 include sun gears 111 and 211 and sun gear connection bodies 112 and 212.

The sun gear connection bodies 112 and 212 are coupled to the connection gear bodies 121 and 221. The sun gears 111 and 211 are formed at the center portions of the sun gear connection bodies 112 and 212, and are formed in the shapes of gears on the outer circumferential surfaces thereof to be meshed with the planetary gear sections 130 and 230.

The rotation centers of the sun gear sections 110 and 210 are concentric with the rotation centers of the connection gear sections 120 and 220. Therefore, if power is transmitted to the connection gear sections 120 and 220 by the power transmission section 70, the connection gear sections 120 and 220 and the sun gear sections 110 and 210 are rotated about the same rotation axes.

The sun gear sections 110 and 210 are disposed inside the inner circumferential surfaces of the connection gear sections 120 and 220 on which the connecting insertion parts 123 and 223 are formed.

The sun gear sections 110 and 210 may be integrally formed with the connection gear sections 120 and 220. Alternatively, the sun gear sections 110 and 210 may be formed as separate bodies from the connection gear sections 120 and 220, and may be integrated with the connection gear sections 120 and 220 through coupling.

As the sun gear sections 110 and 210 are integrally formed with the connection gear sections 120 and 220 or are integrated with the connection gear sections 120 and 220, if the connection gear sections 120 and 220 which are driven by receiving power from the power transmission section 70 are rotated, the sun gear sections 110 and 210 are also rotated together.

The sun gears 111 and 211 are disposed inside the planetary gear sections 130 and 230, respectively, each of which is provided with a plurality of gears. The planetary gear sections 130 and 230 rotate and revolve while being meshed with the sun gears 111 and 211.

The planetary gear sections 130 and 230 include a plurality of planetary gears 131 and 231. The present embodiment illustrates that the numbers of the planetary gears 131 and 231 each are exemplified as four. However, it is to be noted that the present embodiment is not limited thereto, and thus, the numbers of the planetary gears 131 and 231 may each be three or less or five or more.

The plurality of planetary gears 131 and 231 are disposed at equal angles about the rotation centers of the sun gears 111 and 211. The plurality of planetary gears 131 and 231 are meshed with the sun gears 111 and 211, and rotate and/or revolve when the sun gears 111 and 211 are rotated.

The planetary gear sections 130 and 230 are coupled to the carrier sections 150 and 250. In the case where the plurality of planetary gears 131 and 231 revolve around the sun gears 111 and 211, the carrier sections 150 and 250 are also rotated in a clockwise or counterclockwise direction (in FIG. 4).

As the carrier sections 150 and 250 are rotated, the piston sections 170 and 270 are moved toward the brake pad 20 and press the brake pad 20.

The carrier sections 150 and 250 include carrier bodies 151 and 251, carrier rotation shafts 152 and 252, and carrier connection parts 153 and 253.

The carrier rotation shafts 152 and 252 are formed on the carrier bodies 151 and 251 to project toward the planetary gear sections 130 and 230.

The carrier rotation shafts 152 and 252 are provided in plural numbers that are the same as the numbers of the planetary gears 131 and 231 of the planetary gear sections 130 and 230, and are coupled through the planetary gears 131 and 231 of the planetary gear sections 130 and 230. Due to this fact, the planetary gears 131 and 231 of the planetary gear sections 130 and 230 may perform rotating motion while being rotated on the carrier rotation shafts 152 and 252.

The carrier connection parts 153 and 253 are formed on the inner circumferential surfaces of the carrier bodies 151 and 251, and are connected to piston connection parts 173 and 273 of the piston sections 170 and 270.

In the present embodiment, the carrier connection parts 153 and 253 have grooves, and the piston connection parts 173 and 273 have protrusions which are inserted into the grooves of the carrier connection parts 153 and 253.

Alternatively, the piston connection parts 173 and 273 may have grooves, and the carrier connection parts 153 and 253 may have protrusions which are inserted into the grooves of the piston connection parts 173 and 273.

The carrier connection parts 153 and 253 and the piston connection parts 173 and 273 may be spline-coupled to each other. Of course, the carrier sections 150 and 250 and the piston sections 170 and 270 may be coupled in other ways, for example, screw coupling or the like, in addition to the spline coupling.

The piston sections 170 and 270 are connected with the carrier sections 150 and 250. The piston sections 170 and 270 are rotated together as the carrier sections 150 and 250 are rotated.

The piston sections 170 and 270 include piston bodies 171 and 271, piston shafts 172 and 272, and the piston connection parts 173 and 273.

The piston bodies 171 and 271 are formed to be internally hollow, and are disposed to be capable of being brought into contact with the brake pad 20 by the movement thereof. The piston bodies 171 and 271 may be formed in cylindrical shapes.

The piston bodies 171 and 271 are coupled with the piston shafts 172 and 272, and the piston connection parts 173 and 273 are formed at ends of the piston shafts 172 and 272, that is, ends of the piston shafts 172 and 272 which face the carrier sections 150 and 250.

When the carrier sections 150 and 250 are rotated, the piston connection parts 173 and 273 which are spline-coupled to the carrier connection parts 153 and 253 are rotated, and thereby, the rotational motion of the carrier sections 150 and 250 is converted into the linear motion of the piston sections 170 and 270.

Due to the linear movement of the piston sections 170 and 270, the piston sections 170 and 270 are moved toward the brake pad 20. Therefore, as the piston sections 170 and 270 are brought into contact with the brake pad 20 and press the brake pad 20, a braking force is generated due to the friction between the brake pad 20 and the disc.

The load transmission unit 300 is connected to each of the pair of pressing units 100 and 200, and transmits a pressing load of any one of the pressing units 100 and 200 to the other of the pressing units 100 and 200.

The load transmission unit 300 in accordance with the embodiment of the present disclosure includes the pair of ring gear sections 310. The load transmission unit 300 may further include one or more transmission gear sections 320.

The pair of ring gear sections 310 are meshed with the planetary gear sections 130 and 230, respectively, to be able to be rotated thereby.

Figure 12:
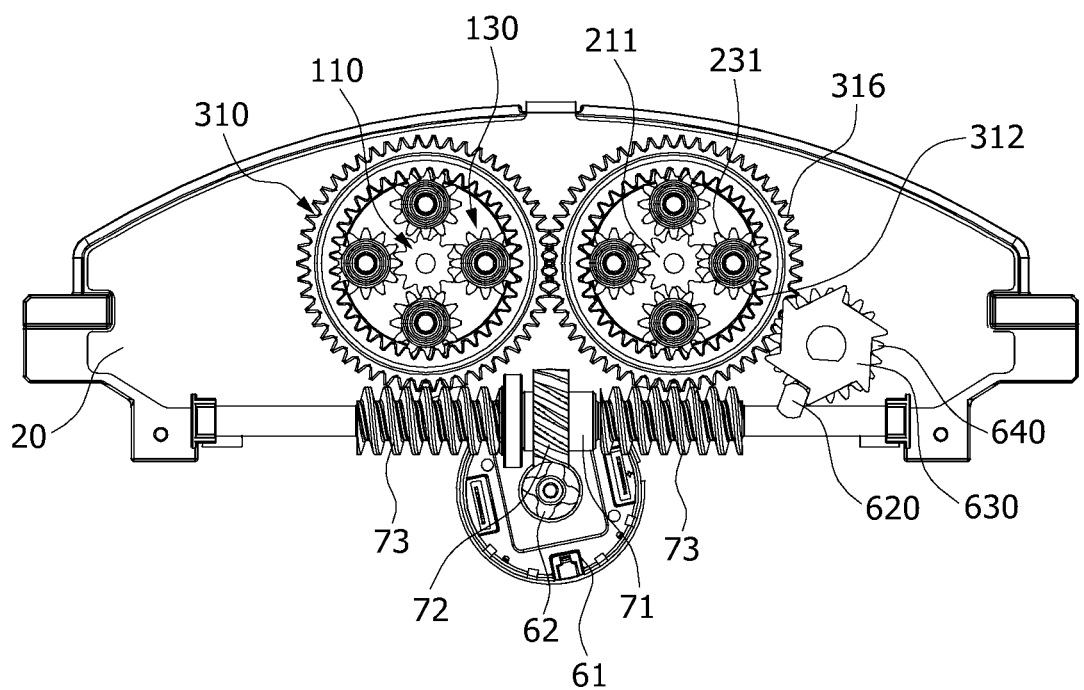

The pair of ring gear sections 310 may be directly meshed with each other (in FIG. 12). In other words, the pair of ring gear sections 310 may be directly connected with each other without disposing the transmission gear sections 320 therebetween. In this case, the spacing between the pair of ring gear sections 310 illustrated in FIG. 4, that is, the spacing between the connection gear sections 120 and 220 at one side and the other side, is further reduced, and thus, in conformity with this, the spacing between the transmission worm gears 73 at the one side and the other side, which are meshed with the connection gear sections 120 and 220, may be further reduced.

Alternatively, the pair of ring gear sections 310 may be indirectly meshed by the medium of the one or more transmission gear sections 320. Namely, the transmission gear sections 320 may be disposed between the pair of ring gear sections 310 and meshed with the ring gear sections 310.

Referring to FIGS. 3 to 7, the respective ring gear sections 310 may be installed between the planetary gears 131 and 231 and the connection wheels 122 and 222.

Each ring gear section 310 includes the ring gear inner part 311 and a ring gear outer part 315.

The ring gear inner parts 311 are disposed outside the planetary gear sections 130 and 230, and internal gear portions 312 may be formed on the inner circumferential surfaces of the ring gear inner parts 311 to be meshed with the planetary gear sections 130 and 230.

The internal gear portion 312 of the ring gear inner part 311 which is installed at one side (the left side in FIG. 5) is meshed with the planetary gear section 130 to be rotated in the clockwise or counterclockwise direction (in FIG. 5), and transmits power to the ring gear section 310, specifically, the ring gear outer part 315, which is disposed at the other side (the right side in FIG. 5), through the transmission gear sections 320.

The ring gear outer part 315 is coupled to the outer surface of the ring gear inner part 311, and an external gear portion 316 is formed on the outer circumferential surface of the ring gear outer part 315 to be meshed with the transmission gear section 320. The ring gear outer part 315 may be integrally formed with the ring gear inner part 311.

As the internal gear portion 312 of the ring gear inner part 311 which is installed at the one side (the left side in FIG. 5) is rotated while being meshed with the planetary gear section 130, the ring gear outer part 315 which is integrally formed with the ring gear inner part 311 is also rotated in the same direction.

Therefore, the rotational force of the ring gear outer part 315 at the one side is transmitted to the ring gear section 310, specifically, the ring gear outer part 315, which is disposed at the other side (the right side in FIG. 5), through the transmission gear sections 320.

The transmission gear sections 320 are rotated by being meshed with the external gear portions 316 which are formed on the ring gear sections 310, specifically, the ring gear outer parts 315, and transmit the rotational power of the ring gear section 310 disposed at the one side to the ring gear section 310 disposed at the other side.

The rotational power transmitted to the ring gear section 310 at the other side is transmitted to the carrier section 250 which is coupled to the planetary gears 231, via the ring gear inner part 311 and the planetary gears 231. As the planetary gears 231 rotate and revolve on the outer circumferential surface of the sun gear 211, the carrier section 250 which is coupled to the planetary gears 231 is rotated, and thus, the piston section 270 is moved toward the brake pad 20.

In the case where pressing loads for pressing the brake pad 20 are non-uniformly applied to the pair of pressing units 100 and 200, specifically, the pair of piston sections 170 and 270, the load transmission unit 300 may transmit a pressing load of the piston section 170 at the one side to the piston section 270 at the other side such that the pair of piston sections 170 and 270 may be brought into contact with the brake pad 20 with uniform pressing loads.

Of course, conversely, a pressing load of the piston section 270 at the other side may be transmitted to the piston section 170 at the one side.

Referring to FIGS. 4 to 7, in the present embodiment, the transmission gear sections 320 are formed in the shapes of spur gears, and are rotated by being meshed with the external gear portions 316 formed on the outer circumferential surfaces of the ring gear outer parts 315.

However, in addition to the shapes of spur gears, the shapes of the transmission gear sections 320 may be replaced with various shapes such as the shapes of bevel gears and the shapes of helical gears whose gear teeth are formed to be inclined at a predetermined angle with respect to the rotation axes of the transmission gear sections 320.

Moreover, while it is illustrated that the transmission gear sections 320 have the shapes of gears, it is to be noted that the disclosure is not limited thereto, and various modifications are possible like a configuration in which the transmission gear sections 320 are connected in the shapes of belts to the pair of ring gear sections 310 and transmit power of the pressing unit 100 at the one side to the pressing unit 200 at the other side.

The number of the ring gear sections 310 of the load transmission unit 300 may be changed. Therefore, the number of the ring gear sections 310 is not limited to two as in the present embodiment, and may be variously changed to one or three or more depending on a distance between the pair of pressing units 100 and 200.

The operation principle of the parking brake apparatus 1 for a vehicle constructed as mentioned above will be described below.

In the parking brake apparatus 1 for a vehicle in accordance with the embodiment of the present disclosure, the plurality of pressing units 100 and 200 press the brake pad 20 to move the brake pad 20 toward the disc, and a braking force is generated due to the contact friction between the brake pad 20 and the disc.

In the embodiment of the present disclosure, two pressing units 100 and 200 are provided. However, it is to be noted that the present disclosure is not limited thereto, and various modifications such as three or more pressing units are possible.

The pressing units 100 and 200 receive power from the driving unit 50, and are linearly reciprocated relative to the brake pad 20.

In detail, when power is generated in the motor section 60 by receiving electric power from the outside, the power transmission section 70 which is connected with the motor section 60 is rotated by receiving power from the motor section 60. The power transmission section 70 simultaneously transmits rotational power to the pair of pressing units 100 and 200.

By driving the motor section 60, the transmission worm wheel 72 is rotated, and accordingly, as the respective transmission worm gears 73 are rotated, the connection gear sections 120 and 220 which are meshed with the transmission worm gears 73 are rotated.

According to the rotation of the connection gear sections 120 and 220, the sun gear sections 110 and 210 are also rotated in an interlocked manner, and the planetary gears 131 and 231 which are meshed with the sun gears 111 and 211 perform rotating motion and at the same time perform revolving motion around the sun gears 111 and 211.

As the planetary gears 131 and 231 perform the revolving motion, the carrier sections 150 and 250 which are coupled to the planetary gears 131 and 231 are rotated in the clockwise or counterclockwise direction. As the carrier sections 150 and 250 are rotated, the piston sections 170 and 270 which are coupled to the carrier sections 150 and 250 are moved toward the brake pad 20 and press the brake pad 20 by being brought into contact with the brake pad 20.

Due to various factors, the power provided from the driving unit 50 may be transmitted more to any one of the pair of pressing units 100 and 200.

As illustrated in FIG. 6, when driving the parking brake apparatus 1 for a vehicle, in the case where power is transmitted more to the pressing unit 100 disposed at the one side (the left side in FIG. 6) than the pressing unit 200 disposed at the other side (the right side in FIG. 6), the piston section 170 at the one side may be brought into contact with the brake pad 20 earlier than the piston section 270 at the other side.

If the piston section 170 at the one side is in a state in which it is already brought into contact with the brake pad 20 and the piston section 270 at the other side is in a state in which it is not yet brought into contact with the brake pad 20, the planetary gear section 130 of the pressing unit 100 at the one side performs only rotating motion. That is to say, the planetary gear section 130 does not perform revolving motion.

Since the power generated by the operation of the driving unit 50 is continuously transmitted to the sun gear 111, the sun gear 111 is continuously rotated. At this time, since the piston section 170 is in the state in which it is already brought into contact with the brake pad 20, the plurality of planetary gears 131 which are meshed with the sun gear 111 do not perform revolving operation but perform only rotating motion.

Since the pressing unit 100, specifically, the piston section 170, which is disposed at the left side in FIG. 6 can no longer be moved toward the brake pad 20, due to a reaction force to this, the planetary gears 131 perform only rotating motion, and the ring gear inner part 311 which is formed with the internal gear portion 312 to be meshed with the planetary gears 131 is rotated in the clockwise or counterclockwise direction.

The reaction force, which is generated in the pressing unit 100 at the one side (the left side in FIG. 6) through the ring gear outer part 315 which is integrally coupled with the ring gear inner part 311, is transmitted to the pressing unit 200 at the other side (the right side in FIG. 6) through the transmission gear sections 320.

In detail, the power provided to the pressing unit 100 at the one side is transmitted to the piston section 270 at the other side through the external gear portion 316 at the other side, the internal gear portion 312 of the ring gear inner part 311, the planetary gear section 230 and the carrier section 250 coupled with the planetary gear section 230.

Accordingly, the power provided from the driving unit 50 is provided to the piston section 270 at the other side which is not yet brought into contact with the brake pad 20, and the linear movement of the piston section 170 at the one side which is already brought into contact with the brake pad 20 is stopped until the piston section 270 at the other side is brought into contact with the brake pad 20.

Thereafter, when both the piston sections 170 and 270 at the one side and the other side are brought into contact with the brake pad 20, the power of the driving unit 50 is provided to the respective piston sections 170 and 270 at the one side and the other side, and the piston sections 170 and 270 at the one side and the other side simultaneously press the brake pad 20 with uniform loads.

Referring to FIGS. 4 to 7, in the case where a pressing load is concentrated on the pressing unit 100 at the one side between the pair of pressing units 100 and 200, the load transmission unit 300 in accordance with the embodiment of the present disclosure may transmit the pressing load to the pressing unit 200 at the other side such that the pair of pressing units 100 and 200 may press the brake pad 20 toward the disc with uniform pressing loads.

Likewise, in the case where a pressing load is more concentrated on the pressing unit 200 at the other side between the pair of pressing units 100 and 200, the load transmission unit 300 may transmit the pressing load to the pressing unit 100 at the one side such that the pair of pressing units 100 and 200 may press the brake pad 20 toward the disc with uniform pressing loads.

Referring to FIG. 3, the ring gear inner parts 311 may project more toward the sun gear sections 110 and 210 (the left side in FIG. 3) than the ring gear outer parts 315, and may be inserted into the connecting insertion parts 123 and 223 of the connection gear sections 120 and 220.

Due to this fact, it is possible to prevent the ring gear sections 310 from being released from the connection gear sections 120 and 220 or the sun gear sections 110 and 210 when receiving rotational power from the driving unit 50.

As the carrier sections 150 and 250 are spline-coupled to the piston sections 170 and 270, the rotational power of the carrier sections 150 and 250 may be transmitted to the piston sections 170 and 270, specifically, the piston connection parts 173 and 273.

The piston connection parts 173 and 273 are coupled to the piston shafts 172 and 272 which are coupled to the piston bodies 171 and 271, and, by the rotational power received through the carrier sections 150 and 250, cause the piston bodies 171 and 271 to be linearly moved toward the brake pad 20.

Referring to FIGS. 8 to 11, the parking brake apparatus 1 for a vehicle in accordance with the embodiment of the present disclosure further includes a load transmission unit restraint unit 600.

The load transmission unit restraint unit 600 may selectively restrain the driving of the load transmission unit 300. That is to say, in the case where the driving of the load transmission unit 300 is not required, the driving of the load transmission unit 300 may be restrained by the operation of the load transmission unit restraint unit 600.

The load transmission unit restraint unit 600 includes a restraint driving section 610, a restraint lever 620, a restraint gear 630, and an interlocked gear 640.

The restraint driving section 610 may selectively restrain the rotation of the restraint gear 630 by extending and retracting the restraint lever 620. In the present embodiment, the restraint driving section 610 may be a solenoid section which extends and retracts the restraint lever 620 by an electromagnetic force when electric power is inputted. Meanwhile, the solenoid section as the restraint driving section 610 may be replaced with a motor section capable of extending and retracting the restraint lever 620.

The restraint lever 620 is installed in the restraint driving section 610 so as to be extendable and retractable. When electric power is inputted to the restraint driving section 610, the restraint lever 620 extends further from its original position and is disposed within the rotation radius of the restraint gear 630.

By this fact, as the rotation of the restraint gear 630 is blocked by the restraint lever 620, the rotation of the interlocked gear 640 which is interlocked with the restraint gear 630 is also blocked.

As the restraint lever 620 is retracted to the original position, the restraint lever 620 may get out of the rotation radius of the restraint gear 630. By this fact, the rotation of the restraint gear 630 becomes possible, and the rotation of the interlocked gear 640 which is interlocked with the restraint gear 630 also becomes possible.

The restraint gear 630 is disposed such that the rotation radius of the restraint gear 630 overlaps with the position of the restraint lever 620 in an extended state. Therefore, the rotation of the restraint gear 630 is selectively restrained depending on whether the restraint lever 620 is extended from or is retracted to the original position.

The restraint gear 630 is provided with engagement projections 632 each to be engaged with the restraint lever 620. Thus, as any one of the engagement projections 632 is brought into surface contact with the restraint lever 620, the restraint gear 630 receives a rotation restraint force according to the operation of the restraint lever 620.

The restraint gear 630 may include a disc part 631 which is centrally disposed, and the plurality of engagement projections 632 which are disposed along the outer circumference of the disc part 631.

The plurality of engagement projections 632 are disposed at the same rotational interval on the disc part 631. As the plurality of engagement projections 632 are disposed, when the restraint lever 620 is extended, an immediately adjacent engagement projection 632 is engaged with the restraint lever 620, and thus, the rotation of the interlocked gear 640 may be immediately stopped through the restraint gear 630.

The interlocked gear 640 is coupled to the restraint gear 630 in an interlocked manner. Therefore, if the restraint gear 630 is in a rotatable state, the interlocked gear 640 is also in a rotatable state. Conversely, if the restraint gear 630 is not in a rotatable state, that is, a state in which the rotation of the restraint gear 630 is restrained by the restraint lever 620, the interlocked gear 640 is also not in a rotatable state.

The interlocked gear 640 is disposed such that the outer circumferential surface thereof is meshed with the load transmission unit 300. Therefore, the shape of the outer circumferential surface of the interlocked gear 640 is formed to correspond to the shape of the load transmission unit 300 so as to be meshed with the load transmission unit 300.

In the present embodiment, the interlocked gear 640 is disposed to be meshed with the ring gear section 310 at either side of the load transmission unit 300. Therefore, in the case where the rotation of the interlocked gear 640 is restrained by the operation of the restraint lever 620, the rotation of the ring gear section 310 which is meshed with the interlocked gear 640 is also restrained.

The load transmission unit restraint unit 600 restrains the driving of the load transmission unit 300 through the interlocked gear 640. Thus, the interlocked gear 640 is disposed to be meshed with any one of the ring gear section 310 and the transmission gear section 320 of the load transmission unit 300 so as to restrain the driving of the load transmission unit 300.

In the present embodiment, the interlocked gear 640 is meshed with the ring gear section 310, and thereby, restrains, that is, stops, the driving of the load transmission unit 300 through the ring gear section 310.

However, since the disclosure is not limited thereto, the interlocked gear 640 may be meshed with not the ring gear section 310 but the transmission gear section 320 disposed between the pair of ring gear sections 310, and thereby, may restrain the driving of the load transmission unit 30 through the transmission gear section 320.

During a process in which the pair of pressing units 100 and 200 receive power from the driving unit 50 and thereby press the brake pad 20 to cause contact friction with the disc, the load transmission unit restraint unit 600 does not restrain the driving of the load transmission unit 300.

FIG. 10 illustrates a state of the load transmission unit restraint unit 600 during a process in which the pair of pressing units 100 and 200 press the brake pad 20. The restraint lever 620 is disposed at the original position, and thus does not restrain the rotation of the restraint gear 630.

Therefore, the restraint gear 630 and the interlocked gear 640 may be rotated, and the ring gear section 310 which is meshed with the interlocked gear 640 may also be rotated. Hence, at this time, power may be transmitted between the pair of ring gear sections 310.

During a process in which the pair of pressing units 100 and 200 receive power from the driving unit 50 and thereby are separated from the brake pad 20, that is, a process in which a braking force provided to the disc is released, the load transmission unit restraint unit 600 restrains the driving of the load transmission unit 300.

FIG. 11 illustrates a state of the load transmission unit restraint unit 600 during a process in which the pair of pressing units 100 and 200 are separated from the brake pad 20, that is, a process in which a braking force is released.

Since the restraint lever 620 is extended from the original position and is disposed within the rotation radius of the restraint gear 630, the rotation of the restraint gear 630 is restrained. Therefore, the rotation of the restraint gear 630 and the interlocked gear 640 is restrained, and the ring gear section 310 which is meshed with the interlocked gear 640 cannot be rotated. At this time, power is not transmitted between the pair of ring gear sections 310.

In the case where both the pair of pressing units 100 and 200 are normally operated, the pair of piston sections 170 and 270 may be moved in a direction separated from the brake pad 20 by the power provided from the driving unit 50, and thus, a braking force provided to the disc may be released.

In the case where at least any one of the pair of pressing units 100 and 200 abnormally operates, for example, in the case where the pressing unit 100 at the one side between the pair of pressing units 100 and 200 is broken, power is not transmitted between the pressing units 100 and 200 by the load transmission unit 300, and thus, the piston section 170 at the one side does not operate in the direction separated from the brake pad 20.

Accordingly, the carrier section 150 at the one side coupled to the piston section 170 at the one side is not rotated. As the carrier section 150 is not rotated, the planetary gear section 130 performs neither a rotating motion nor a revolving motion, and the sun gear section 110 is also not rotated. However, since power is continuously provided from the driving unit 50 to the sun gear section 110, a load at the driving unit 50 greatly increases at any moment.

When the load of the driving unit 50 reaches a preset value, a control unit (not illustrated) may determine that the brake apparatus 1 including the pressing units 100 and 200 is abnormal, and may issue an abnormality alarm signal to allow a driver to figure out a corresponding situation.

Although the disclosure has been disclosed with reference to the embodiments illustrated in the drawings, the embodiments are only for illustrative purposes, and those skilled in the art will appreciate that various modifications and other equivalent embodiments are possible, without departing from the scope and spirit of the disclosure as defined in the accompanying claims. Thus, the true technical scope of the disclosure should be defined by the following claims.

What is claimed is:

1. A parking brake apparatus for a vehicle, comprising:
  a pair of pressing units receiving power from a driving unit, and pressing a brake pad;
  a load transmission unit installed between the pair of pressing units, connected to each of the pair of pressing units, and transmitting a pressing load of any one of the pair of pressing units to the other pressing unit; and
  a load transmission unit restraint unit selectively restraining driving of the load transmission unit,
  wherein the load transmission unit transmits the pressing load of the one of the pair of pressing units to the other pressing unit when the one of the pair of pressing units is brought into contact with the brake pad earlier than the other pressing unit,
  wherein each of the pair of pressing units comprises:
    a sun gear section rotated by receiving power from the driving unit;
    a planetary gear section rotated by being meshed with the sun gear section;
    a carrier section coupled to the planetary gear section; and
    a piston section connected to the carrier section, and pressing the brake pad by being moved toward the brake pad through receiving rotational power from the planetary gear section,
  wherein the load transmission unit comprises a pair of ring gear sections,
  wherein each of the pair of ring gear sections is rotatable by being meshed with the planetary gear section, and
  wherein the pair of ring gear sections are directly meshed with each other.

2. The parking brake apparatus of claim 1, wherein the load transmission unit restraint unit comprises:
  a restraint driving section providing power;
  a restraint lever extended and retracted by an operation of the restraint driving section;
  a restraint gear rotatably installed, and restrained in its rotation when the restraint lever is extended; and
  an interlocked gear coupled to the restraint gear, rotated in an interlocked manner when the restraint gear is rotated, and disposed to be meshed with the ring gear section.

3. The parking brake apparatus of claim 2, wherein the restraint driving section comprises a solenoid section which extends and retracts the restraint lever with an electromagnetic force when electric power is inputted.

4. The parking brake apparatus of claim 1, wherein the driving unit comprises:
  a motor section receiving electric power from an outside, and generating power; and
  a power transmission section rotated by driving of the motor section, and transmitting a rotational force to the sun gear section.

5. The parking brake apparatus of claim 4, wherein the power transmission section comprises:
  a transmission worm wheel disposed at a middle portion of a transmission shaft, coupled to the motor section, and receiving power from the motor section; and transmission worm gears disposed at both sides of the transmission worm wheel, and each transmitting a rotational force of the transmission worm wheel to the sun gear section.

6. The parking brake apparatus of claim 4, wherein the power transmission section transmits power to the sun gear section through a connection gear section.

7. The parking brake apparatus of claim 6, wherein the connection gear section comprises:
a connection gear body coupled to the sun gear section; and
a connection wheel formed on an outer circumferential surface of the connection gear body, and meshed with the power transmission section.

8. The parking brake apparatus of claim 1, wherein each of the pair of ring gear sections comprises:
a ring gear inner part formed with an internal gear portion on an inner circumferential surface thereof to be meshed with the planetary gear section; and
a ring gear outer part coupled to an outer surface of the ring gear inner part, and formed with an external gear portion on an outer circumferential surface thereof.

9. The parking brake apparatus of claim 8, wherein the ring gear inner part projects more toward the sun gear section than the ring gear outer part, and surrounds the sun gear section and the planetary gear section.

10. The parking brake apparatus of claim 1, wherein the carrier section is spline-coupled to the piston section.

11. The parking brake apparatus of claim 10, wherein the piston section receives rotational power from the carrier section, and is linearly reciprocated relative to the brake pad depending on a rotating direction of the carrier section.

12. A parking brake apparatus for a vehicle, comprising:
a pair of pressing units receiving power from a driving unit, and pressing a brake pad;
a load transmission unit installed between the pair of pressing units, connected to each of the pair of pressing units, and transmitting a pressing load of any one of the pair of pressing units to the other pressing unit; and
a load transmission unit restraint unit selectively restraining driving of the load transmission unit,
wherein the load transmission unit transmits the pressing load of the one of the pair of pressing units to the other pressing unit when the one of the pair of pressing units is brought into contact with the brake pad earlier than the other pressing unit,
wherein each of the pair of pressing units comprises:
a sun gear section rotated by receiving power from the driving unit;
a planetary gear section rotated by being meshed with the sun gear section;
a carrier section coupled to the planetary gear section; and
a piston section connected to the carrier section, and pressing the brake pad by being moved toward the brake pad through the receiving rotational power from the planetary gear section,
wherein the load transmission unit comprises:
a pair of ring gear sections each rotatable by being meshed with the planetary gear section; and
one or more transmission gear sections disposed between the pair of ring gear sections, and meshed with the ring gear sections.

13. The parking brake apparatus of claim 12, wherein the load transmission unit restraint unit comprises:
a restraint driving section providing power;
a restraint lever extended and retracted by an operation of the restraint driving section;
a restraint gear rotatably installed, and restrained in its rotation when the restraint lever is extended; and
an interlocked gear coupled to the restraint gear, rotated in an interlocked manner when the restraint gear is rotated, and disposed to be meshed with the ring gear section.

14. The parking brake apparatus of claim 12, wherein the load transmission unit restraint unit comprises:
a restraint driving section providing power;
a restraint lever extended and retracted by an operation of the restraint driving section;
a restraint gear rotatably installed, and restrained in its rotation when the restraint lever is extended; and
an interlocked gear coupled to the restraint gear, rotated in an interlocked manner when the restraint gear is rotated, and disposed to be meshed with the transmission gear section.

15. A parking brake apparatus for a vehicle, comprising:
a pair of pressing units receiving power from a driving unit, and pressing a brake pad;
a load transmission unit installed between the pair of pressing units, connected to each of the pair of pressing units, and transmitting a pressing load of any one of the pair of pressing units to the other pressing unit; and
a load transmission unit restraint unit selectively restraining driving of the load transmission unit,
wherein each of the pair of pressing units comprises:
a sun gear section rotated by receiving power from the driving unit;
a planetary gear section rotated by being meshed with the sun gear section;
a carrier section coupled to the planetary gear section; and
a piston section connected to the carrier section, and pressing the brake pad by being moved toward the brake pad through receiving rotational power from the planetary gear section,
wherein the driving unit comprises:
a motor section receiving electric power from an outside, and generating power; and
a power transmission section rotated by driving of the motor section, and transmitting a rotational force to the sun gear section, and
wherein the power transmission section comprises:
a transmission worm wheel disposed at a middle portion of a transmission shaft, coupled to the motor section, and receiving power from the motor section; and
transmission worm gears disposed at both sides of the transmission worm wheel, and each transmitting a rotational force of the transmission worm wheel to the sun gear section.

* * * * *